J. M. GOFF.

Assignor to C. M. and R. H. AVERY.

STALK CUTTING-MACHINE.

No. 7,469. Reissued Jan. 16, 1877.

Witnesses:

P. R. Richards.

M. H. Baringer.

Inventor:

James M. Goff,

By W. B. Richards,

Atty.

N. PETERS, PHOTO-LITHOGRAPHER, WASHINGTON, D.C.

UNITED STATES PATENT OFFICE.

JAMES M. GOFF, OF NORTH HENDERSON, ASSIGNOR, BY MESNE ASSIGNMENTS, TO CYRUS M. AVERY, OF GALESBURG, ILLINOIS, AND ROBERT H. AVERY, OF PEACE, KANSAS.

IMPROVEMENT IN STALK-CUTTING MACHINES.

Specification forming part of Letters Patent No. 57,893, dated September 11, 1866; reissue No. 7,469, dated January 16, 1877; application filed August 9, 1875.

*To all whom it may concern:*

Be it known that I, JAMES M. GOFF, now of North Henderson, county of Mercer, and State of Illinois, and formerly of Ionia, county of Warren, and same State, have invented certain new and useful Improvements in Stalk-Cutters; and I do hereby declare that the following is a full, clear, and exact description thereof, which will enable others skilled in the art to which it appertains to make and use the same, reference being had to the accompanying drawings, and to letters of reference marked thereon, which form a part of this specification.

This invention relates to a new and improved machine for cutting corn, cotton, or other stalks in the field into short lengths, preparatory to plowing under, or for other purposes; and the invention consists, first, in the use of levers pivoted to the frame which carries the cylinder of cutters, and having wheels journaled to one of their ends, while their other ends extend beyond their fulcrum to the main frame and form handles for operating said levers, to adjust the relative heights of the cylinder of cutters and said wheels; second, in providing means for fixing the levers hereinbefore refered to at different positions, for adjusting the depth of cut of the cutters, and for fixing them in an elevated position above the ground for local transportation; third, in the use of a cylinder of cutters, connected to a draft-pole by a cross-bar and pendants, and arranged with adjustable wheels, all as hereinafter fully described.

Figure 1:
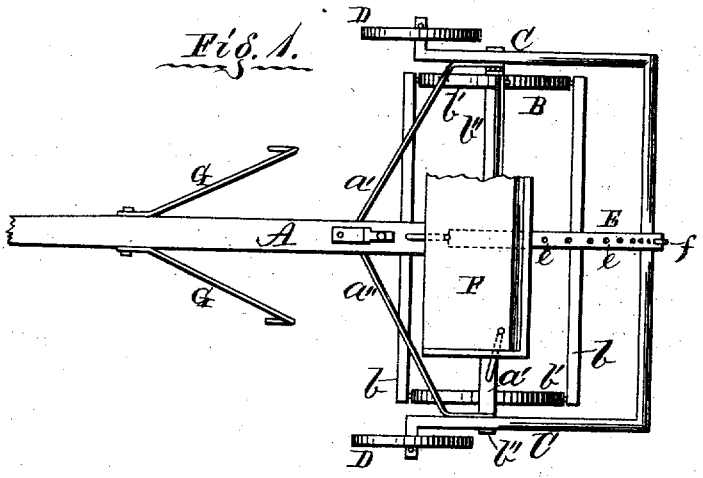
Figure 2:
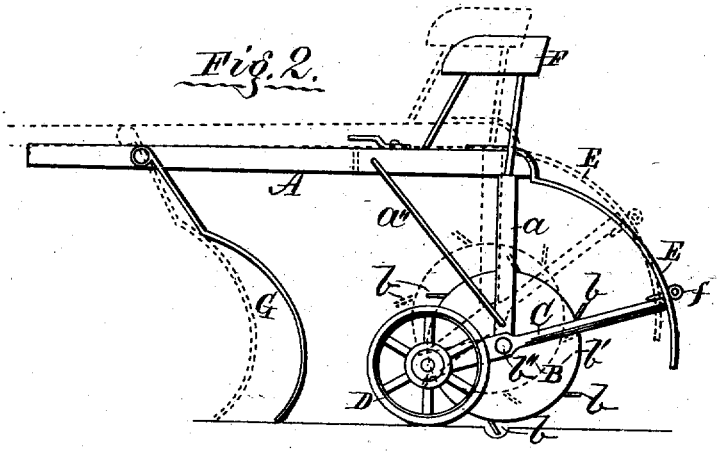

Figure 1 of the accompanying drawing is a top-plan view of a machine embodying my invention. Fig. 2 is a side elevation of the same.

The same letters of reference indicate the same parts in the different views in the drawing.

Letter A represents a draft-pole, to the rear end of which there is secured a transverse bar, *a'*, having a pendent arm, *a*, at each end, at the lower ends of which suitable bearings are provided, for the axial journals of the cylinder of cutters B, said cylinder consisting of an axial shaft, *b''*, carrying heads *b'*, around the periphery of which are arranged the cutters or knives *b*, parallel with the axis of the cylinder B, and projecting, preferably, obliquely, as shown at Fig. 2.

The cylinder of cutters may be constructed otherwise, if preferred, as their peculiar construction is no part of what I claim.

The arms *a* are braced by rods *a''*, from the draft-pole A. C C are levers, one on each side of the machine, and are journaled some distance from their front ends, on the projecting ends of the shaft *b''*. Each lever C carries on its front end an axial bolt, on which is mounted a wheel, D, and said levers C are connected at their rear ends. E is a segment-bar, attached at its upper end to the rear end of the draft-pole A, and projects backward and downward in the arc of a circle, of which the axis of the cutter-cylinder is the center, and with which arc the rear ends of the levers C keep in close proximity when said levers C are oscillated on their fulcra *b''*.

The bar E is perforated with a series of holes, *e*, through which a removable pin, *f*, projects, and which may be inserted above the rear ends of the levers C, as shown by full lines at Fig. 2, for the purpose of elevating the wheels D, and allowing the cylinder of cutters to rest with the full weight of the machine upon the ground, or may be inserted beneath the levers C, for the purpose of supporting the cylinder of cutters entirely above the ground, as shown by dotted lines at same figure, and for convenience of local transportation, or removal short distances.

It will be readily seen that, by intermediate adjustments of the levers C on the bar E, the relative height of the cutter-cylinder and wheels D may be adjusted, and the depth of cut of the blades *b* not only regulated, but the wheels D utilized as supports on each side of the machine, to aid in steadying its running.

F is a driver's seat, mounted on the rear end of the draft-pole A. G G are drag-hooks, attached one to each side of the pole A, for the purpose, as the machine is drawn forward, of dragging or pulling the obliquely lying or standing stalks into line parallel with the path of the machine, and into favorable position for the action of the cutters *b*, which are rotated by impact with the ground, and chop the stalks into lengths equal to the circumferential distances apart of the cutters *b* upon the cylinder B.

Having thus described my invention, what I claim as new, and desire to secure by Letters Patent, is—

1. In a stalk-cutting machine, the combination of the following instrumentalities, viz: a cylinder of cutters, B, and two wheels, D D, said wheels being connected with, and pivoted to, the frame which carries the cutter-cylinder, by means of levers C C, so that the relative height or position of the wheels and cylinders may be regulated by the levers operating directly on the wheels, substantially as and for the purpose specified.

2. In a stalk-cutting machine, the combination of the following instrumentalities, viz: a cylinder of cutters, B, two wheels, D D, levers C, and perforated segment-bar E, by means of which and a pin, *f*, the relative position of the cutter-cylinder and wheels may be fixed and maintained after adjustment, substantially as set forth.

3. The knife or cutter cylinder B, connected to the draft-pole A, substantially as shown and described, in combination with the pivoted frame C, provided with the wheels D D, all being arranged to operate substantially as and for the purpose set forth.

In testimony that I claim the foregoing as my own I have hereunto affixed my signature this 10th day of August, 1876, in the presence of two witnesses.

JAMES M. GOFF.

Witnesses:
I. T. MORFORD,
JOHN L. GOFF.